United States Patent [19]

Croix-Marie

[11] 4,137,988

[45] Feb. 6, 1979

[54] SYSTEM FOR SEALING THE GAP BETWEEN A SURFACE AND A WALL EDGE OPPOSITE IT

[75] Inventor: Francis J. Croix-Marie, Viry-Chatillon, France

[73] Assignee: Bertin & Cie, Plaisir, France

[21] Appl. No.: 808,278

[22] Filed: Jun. 20, 1977

[30] Foreign Application Priority Data

Jun. 25, 1976 [FR] France .................. 76 19334

[51] Int. Cl.² ............................................. B60V 1/02
[52] U.S. Cl. ...................................... 180/130; 15/302; 104/23 FS
[58] Field of Search ................. 180/116, 129, 130; 15/302; 104/23 FS

[56] References Cited

U.S. PATENT DOCUMENTS

| 3,587,471 | 6/1971 | Schneider | 104/23 FS X |
| 3,775,804 | 12/1973 | Hoener, Jr. | 15/302 |

FOREIGN PATENT DOCUMENTS 1238499  7/1960  France .................. 180/129

Primary Examiner—Joseph F. Peters, Jr.
Assistant Examiner—Michael Mar
Attorney, Agent, or Firm—A. W. Breiner

[57] ABSTRACT

The gap between a bearing surface and the free edge of a wall extending opposite this surface and bounding therewith a volume of water or other liquid, is sealed against liquid leakages by a cushion of air or other gas surrounding the gap and having a pressure higher than that of the volume of liquid. This liquid is furthermore circulated along a closed circuit.

8 Claims, 5 Drawing Figures

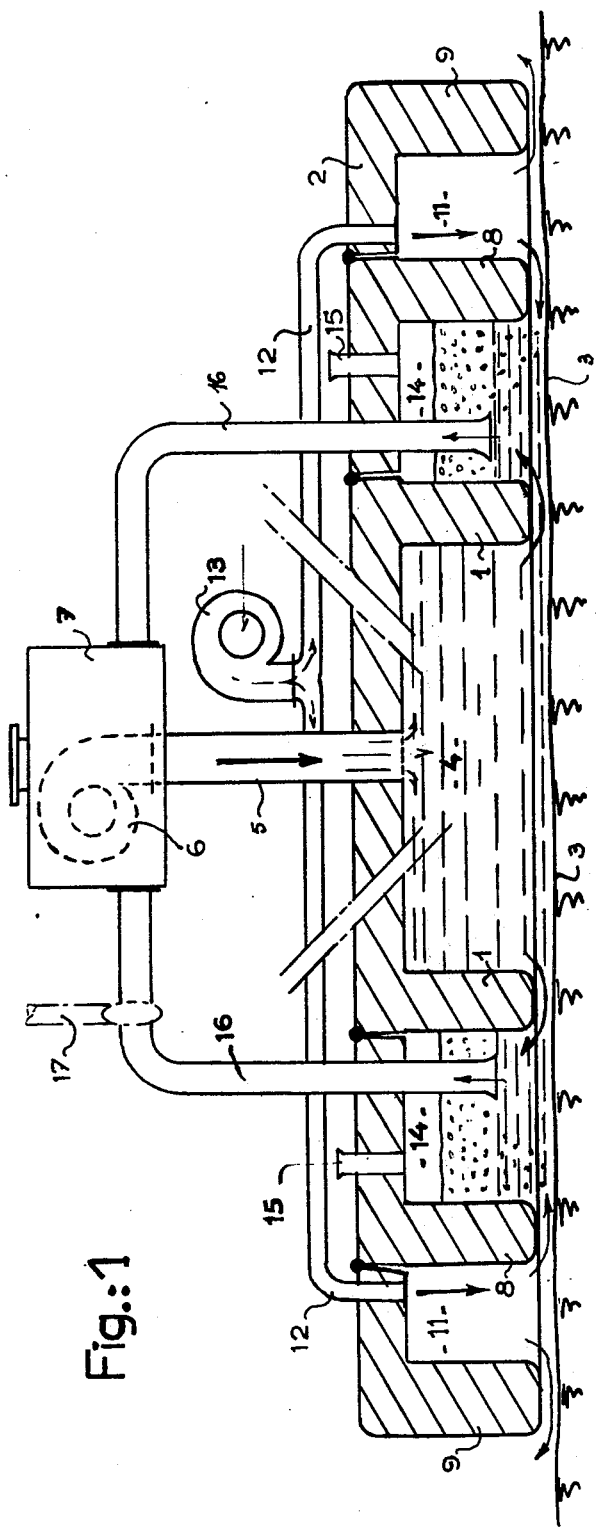
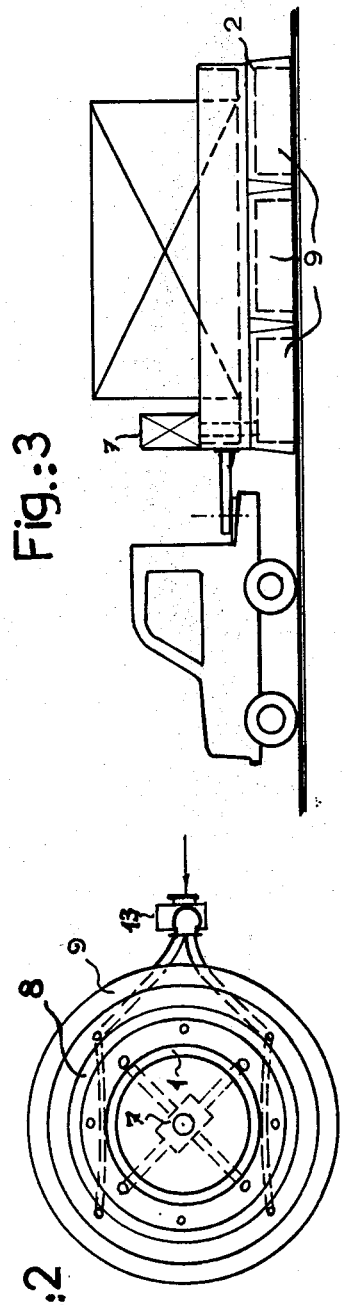

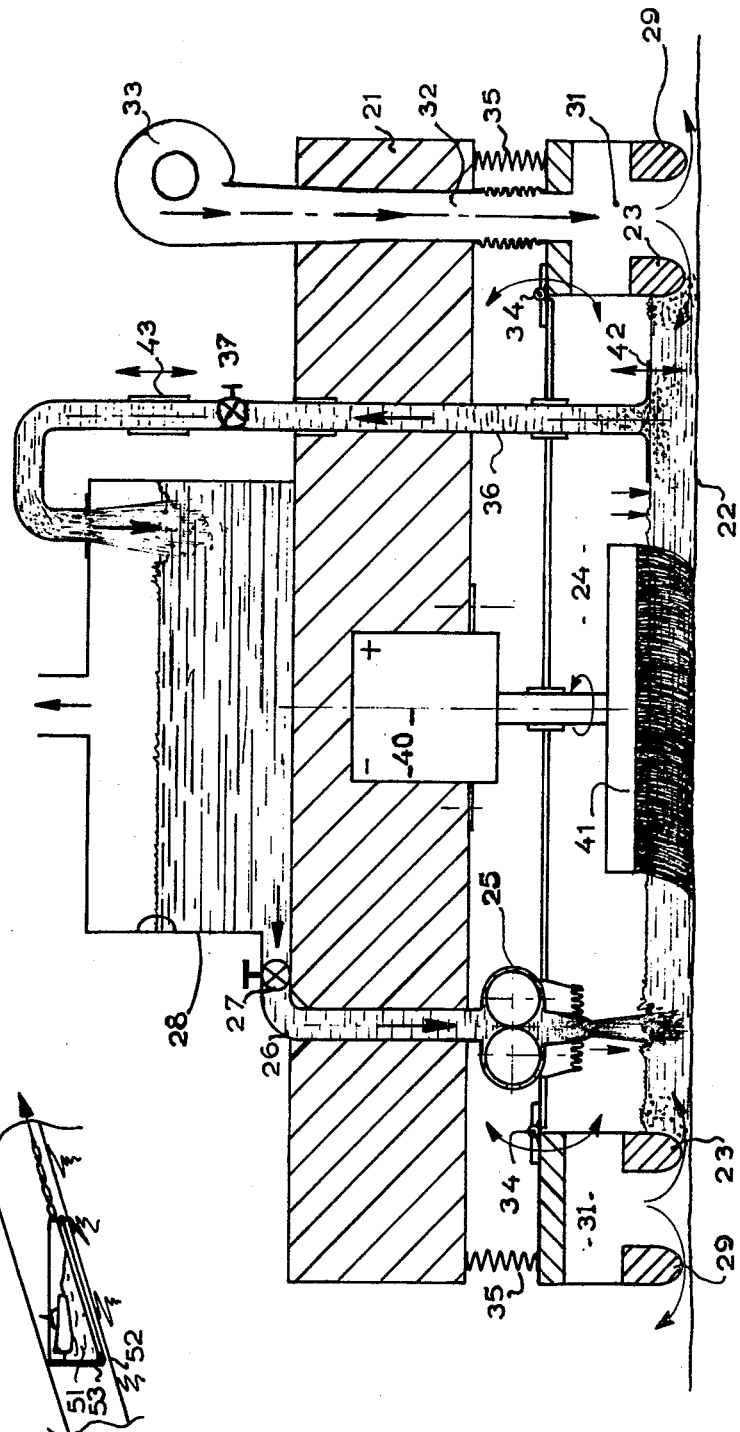
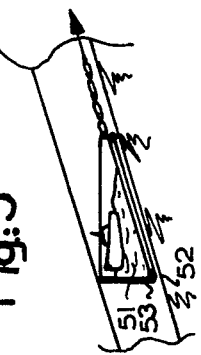

SYSTEM FOR SEALING THE GAP BETWEEN A SURFACE AND A WALL EDGE OPPOSITE IT

The present invention concerns a method for sealing the gap separating a surface and the edge of a wall disposed opposite the said surface and retaining with the surface a volume of a liquid, for example water, apparatus for carrying out the method and its applications.

In known apparatus of this kind, particularly within the field of ground effect, the proposals for sealing the gap between the walls confining a liquid cushion and the supporting surface, proposed using two concentric labyrinth pads between which a suction was produced by reduced pressure. Such descriptions will be found in French Pat. No. 361 501 of May 23, 1905 and in an article in "Science et Vie" No. 43 of March 1919.

Subsequently, liquid cushions were abandoned, undoubtedly because of the considerable leakage involved, and were replaced almost exclusively by cushions of air. However, for the same transported load, liquid cushions provide a considerable economy in power compared to a cushion of air. In fact, since the power is inversely proportional to the square root of the voluminal mass, it follows that, for identical conditions, the cushion of water requires three times less power than the cushion of air.

According to the invention, there is arranged and maintained along at least a portion of the gap separating a surface and the edge of a wall provided opposite the said surface and retaining with the surface a volume of a liquid, for example water, a cushion of a gas, for example air at a pressure higher than that of the volume of liquid.

The gaseous cushion is contained by a confinement assembly, open towards the surface, articulated to the structure and loaded by a resilient or heavy member.

In a first embodiment, the wall retains, with the surface, leakages of the liquid escaping from the confinement device for a cushion of liquid at high pressure.

In a second embodiment, the device also comprises a cleaning member (brush, cloth, etc.), on the inside of the wall, retaining the liquid with the surface, the said member being capable of coming into contact with the surface. The liquid is delivered by a pump into a chamber arranged as a portion of the said wall and is evacuated in combination with the gas by the pressure prevailing in the said chamber. Alternatively, the liquid may be introduced by gravity into the said chamber situaded in the open air and be evacuated by a pump. The said chamber comprises a pipe-line the free end of which is provided with a sucker the distance of which from the surface is variable.

The invention is of especially interesting application in the displacement of a load on a liquid cushion and in the cleaning of surfaces, or in their de-icing.

FIG. 1 is a view in longitudinal section of a first embodiment of the invention.

FIG. 2 is a view from below on a reduced scale of the same embodiment.

FIG. 3 is a diagrammatic view of a first application of the invention.

FIG. 4 is a diagrammatic view in longitudinal section of a second embodiment and of a second application of the invention.

FIG. 5 is a diagrammatic view in section of a third application of the invention.

Referring to FIGS. 1 and 2, the first illustrated embodiment of the invention is constituted by an annular confinement device 1 arranged beneath a platform 2 and opposite a supporting surface 3.

The volume 4 thus formed by the confinement device 1 and the bottom of the platform is supplied with a fluid under pressure, such as a liquid, preferably water, by a pipe-line 5 provided with a pump shown diagrammatically at 6, from a tank 7.

A first chamber 8 and a second chamber 9 are arranged around the said confinement device 1. The first and second chambers define, with the bottom of the platform, a space 11 disposed opposite the supporting surface and supplied with a fluid at low pressure, such as a gas, preferably air, through one or a plurality of conduits 12 from a compressor 13. The confinement device 1 and the chamber 8 define, with the bottom of the platform, a chamber 14 also arranged opposite the supporting surface 3. This chamber 14 is connected on the one hand to atmosphere by air vent 15 and connected by a water recovery conduit 16 to the tank 7 or to any other utility by the conduit 17. It will be noted that the entrance to the conduit 16 or water recovery take-up. In the chamber 14 is at a level with respect to the supporting surface lower than the air vent 15.

This first embodiment according to the invention constitutes a cushion of water at high pressure with total water recovery and a low consumption of air power.

By way of non-limiting example, the values of the different pressures with respect to atmosphere may be as follows:

within the volume 4: 3 bars
within the chamber 14: 5 cm water gauge
within the space 11: 20 cm water gauge the intensity is with respect to the pressures and the extents of leakage at each confinement device or chamber. The operation of this first embodiment is as follows:

Setting the compressor 13 in operation followed by the pump 6 ensures respective supplies of gas and water to the space 11 and the volume 4. The chamber 14 collects leakage water escaping beneath the confinement device 1. This chamber, being connected to atmosphere, is at an intermediate pressure between that of the space 11 and that of the volume 4. Thus, the leakage beneath the chamber 8 takes place in the sense from space 11 towards the chamber 14, thus preventing water coming from the volume 4 escaping towards the outside. The gas escapes beneath the chamber 9 in the usual manner for a cushion of gas.

Water is pumped from the chamber 14 and eventually re-cycled into the tank 7 through the conduit 16. As a variant, regulation of the closure of the air vent 15 enables the pressure of the air escaping from the space 11 to be used to assist in the recovery of water through the conduit 16. This variant has the advantage of permitting re-cycling of the water without using an emulsion pump of delicate operation.

FIG. 3 illustrates a first application of the invention to the transfer of heavy loads. The platform 2 on which the charge is arranged is provided with a plurality of liquid recovery cushion confinement devices such as previously described. The use of liquid cushions for a similar load and similar height above the ground, enables the power provided to be considerably reduced with respect to gaseous cushions (three times less) for a low power necessary to seal the liquid leakage gaps and to recover the liquid.

With regard to FIG. 4, a second embodiment of the invention cas be seen illustrated according to a second application of the invention.

This embodiment comprises a structure 21 in relation to a supporting surface 22, the ground for example, through the agency of a confinement device or enclosure 23. This enclosure 23 defines a chamber 24 supplied with a fluid such as a liquid, preferably water, possibly by virtue of a pump 25 connected by the pipe-line 26 and the valve 27 to a tank 28. Around the said enclosure is provided a second enclosure 29 which, with the first enclosure and the bottom of the platform, defines a peripheral space 31 supplied with a fluid under pressure such as a gas, preferably air, through a conduit 32 from a compressor 33. The pressure of the gas prevailing in the space 31 is higher than the pressure in the chamber 24 at the level of the leakage gap beneath the enclosure 23. Thus, sealing of the volume 24 containing liquid is produced by a peripheral gas cushion pressurizing the possible escape of liquid through the gap between the supporting surface 22 at the ground and the ends of the enclosure 23.

Recovery of the liquid gaz emulsion takes place through the pipe-line 36 associated with a valve 37. This emulsion may be returned to the tank 28, open to atmosphere, to allow the gas to escape.

The confinement assembly for the peripheral space 31 may be articulated at 34 to the structure and loaded by a resilient member 35 (mechanical spring or pneumatic) possibly associated with shock absorbers (not shown). Thus, the confinement assembly is produced as a follower, that is to say it adapts to the relief of the supporting surface and ensures an appropriate height above the ground and a regulated gas pressure.

The enclosures 23 and 29 as well as the previous chambers 1, 8 and 9 may be provided by any means known within the ground effect field for the confinement of fluid cushions. One advantageous arrangement consists in using the confinement devices described in U.S. Pat. No. 3,647,018 in the name of Bertin & Cie.

One particularly interesting application of the invention consists in adapting the previously described device to provide a machine for cleaning a surface (ground, wall). This machine ensures brushing with a plentiful supply of liquid products, with circulation of the liquid over the ground, recovery and filtration of the said liquid without loss of the latter outside the machine such that the ground remains only slightly damp if not dry after the passage of the machine.

This machine comprises (still FIG. 4) complimentary to that which as just been described, a cleaning member 41 (brush or cloth) rotated by an electric motor or combustion engine 40. This brush, situated within the volume 24, is adapted to be in contact with the surface 22 by means of common adjusting members (not shown).

At its free end, the pipe-line 36 comprises a sucker 42. An adjustment in the length of the pipe-line 36 shown diagrammatically at 43, enables the distance of the sucker from the supporting surface to be varied.

The valve 37 regulates the recovery flow of the emulsion. The operation of this cleaning machine is as follows: the tank supplies the volume 4 with liquid (water plus possible detergents) by the pump of low volume flow, high pressure. The compressor (or fan) 33 supplies the peripheral cushion within the space 31 with gas (air) at large flow volume and at a pressure corresponding to the head of water in the reservoir and pressurizing the chamber 24 so as to cause the water air mixture to rise through the sucker (as a variant the chamber could be at atmospheric pressure, the liquid falling by gravity, the air leaving by the air vent and the water evacuated by a pump or by low pressure created in the reservoir by the entry of the air from the fan itself).

The level of the liquid remains at the level of the sucker 42, the only point of equilibrium since if the level falls, the pressure in the chamber 24 drops and the pump 25 overfeeds liquid; if the level rises, the pressure increases, the liquid rises and the pressure falls because the volume flow of air is much greater than that of water.

After use, the sucker 42 is brought into contact with the surface, this has the effect of recovering the entire liquid in the tank.

By way of non-limiting example, so as to show the practicality of the invention, the applicants have carried out the following test:

two concentric joints of respective diameters of 300 mm and 450 mm
head of water: 3 cm
air supply: 15 Nl/s
air cushion pressure: 5 cm water gauge.

Results of the test:

on smooth cement the ground remained slightly damp according to the speed of displacement,
on rough concrete, the ground appeared slightly damp without any drop of localised water in the holes,
during the passage of travel at a height of 4 mm, pratically no loss of water.

With regard to FIG. 5, there can be seen the application of the invention to the displacement over a surface 52 of a mass of water 51 retained by the movable walls 53. The gaps between the movable walls and the surfaces or fixed walls are provided with an air cushion pressurizing the leakages as previously described.

The invention also applies to "wedges" of water for the transport of barges, or the transport of swimming pools (summer and winter position) etc.

The invention also applies to de-icing machines for the recovery of the de-icing products (FRIGOL).

I claim:
1. A ground-effect apparatus having a solid frame designed to move above and proximate to a generally horizontal backing surface with the interposition of a pressure fluid cushion system lifting said solid frame out of physical contact engagement with said backing surface and in substantially frictionless, generally horizontal motion relationship with respect thereto, comprising:

inner wall means depending from said frame and projecting towards said backing surface to end short thereof, said inner wall means bounding laterally an inner chamber wide open towards said backing surface and bottomed thereby, a compact mass of liquid contained in said inner chamber by said inner wall means, in outright wetting contact with the chamber bottoming extent of said backing surface, which is coextensive with the area of said inner chamber as defined by said inner wall means, outer wall means spaced outwardly from said inner wall means and likewise thereto depending from said frame and projecting towards said backing surface to end short thereof, said outer wall means bounding laterally an outer chamber around said inner chamber, wide open towards said backing surface and bottomed thereby, means for feeding said outer chamber with gaseous fluid at a pressure in excess of the pressure obtaining in said inner chamber, thereby precluding leakage of liquid from said inner chamber into said outer chamber through the intervening peripheral gap between said backing surface and said inner wall means ending short thereof, and means for circulating said liquid along a closed circuit which includes said inner chamber and a hydraulic loop outside the same.

2. Apparatus as claimed in claim 1, wherein said hydraulic loop outside said inner chamber comprises a liquid tank fitted on said frame, upward-flow piping means sucking liquid from said inner chamber and delivering the sucked liquid to said tank, and downward-flow piping means tapping liquid from said tank and delivering the tapped liquid to said inner chamber.

3. Apparatus as claimed in claim 2, further comprising a liquid pump in said downward-flow piping means.

4. Apparatus as claimed in claim 2, comprising a central compartment through which said downward-flow piping means deliver said tapped liquid to said inner chamber, said inner chamber being interposed between said central compartment and said outer chamber and being separated from said central compartment by a partition depending from said frame and projecting towards said backing surface to end short thereof, whereby said central compartment communicates with said inner chamber through the intervening peripheral gap between said backing surface and said partition ending short thereof.

5. Apparatus as claimed in claim 4, wherein said central compartment is wide open towards said backing surface and is bottomed thereby, the liquid in said central compartment being at a pressure higher than that obtaining in said inner chamber, whereby liquid leaks through said latter-mentioned gap from said central compartment into said inner chamber.

6. Apparatus as claimed in claim 5, further comprising means on said frame for venting said inner chamber to the atmosphere.

7. Apparatus as claimed in claim 1, wherein said outer chamber is hinged to said frame and is thereby subjected to a moment relative thereto due to the gaseous pressure in said outer chamber, said apparatus further comprising means for loading said outer chamber in the sense which counteracts said moment.

8. Apparatus as claimed in claim 3, wherein the liquid contained in said inner chamber is pressurized to rise along said upward-flow piping means, the liquid pressure in said inner chamber being however lower than the gas pressure obtaining in said outer chamber.

* * * * *